United States Patent
Erving et al.

(10) Patent No.: US 6,707,886 B2
(45) Date of Patent: Mar. 16, 2004

(54) METHOD AND SYSTEM FOR TESTING SUBSCRIBER LOOPS USING TOUCHTONE TELEPHONE SIGNALS

(75) Inventors: Richard Henry Erving, Piscataway, NJ (US); Maura Elizabeth Marcus, Middletown, NJ (US); Robert Raymond Miller, II, Convent Station, NJ (US); Christopher W. Rice, Parsippany, NJ (US)

(73) Assignee: AT&T Corp., New York, NY (US)

( * ) Notice: Subject to any disclaimer, the term of this patent is extended or adjusted under 35 U.S.C. 154(b) by 116 days.

(21) Appl. No.: 10/074,281

(22) Filed: Feb. 12, 2002

(65) Prior Publication Data

US 2003/0156685 A1 Aug. 21, 2003

Related U.S. Application Data

(60) Provisional application No. 60/297,070, filed on Jun. 8, 2001.

(51) Int. Cl.$^7$ .............................. H04M 1/24; H04M 3/08
(52) U.S. Cl. .................. 379/1.04; 379/1.01; 379/1.03; 379/27.01; 379/27.02; 379/28; 379/29.01; 379/31; 379/22
(58) Field of Search .................. 379/1.01, 1.03, 379/1.04, 2, 9, 14.01, 15.05, 21, 22, 22.01, 22.02, 22.03, 22.08, 23, 24, 27.01, 27.02, 27.08, 28, 29.01, 29.02, 29.06, 31

(56) References Cited

U.S. PATENT DOCUMENTS

| | | | |
|---|---|---|---|
| 5,974,115 A | * 10/1999 | Chan et al. | 379/27.01 |
| 6,091,713 A | 7/2000 | Lechleider et al. | |
| 6,212,374 B1 | * 4/2001 | Scott et al. | 455/422.1 |
| 6,266,395 B1 | * 7/2001 | Liu et al. | 379/27.01 |
| 6,351,770 B1 | * 2/2002 | Li et al. | 709/225 |
| 6,459,773 B1 | * 10/2002 | Posthuma | 379/1.04 |
| 6,463,126 B1 | * 10/2002 | Manica et al. | 379/27.01 |
| 6,477,238 B1 | * 11/2002 | Schneider et al. | 379/22.04 |
| 6,487,276 B1 | * 11/2002 | Rosen et al. | 379/1.04 |
| 6,625,255 B1 | * 9/2003 | Green et al. | 379/1.04 |

* cited by examiner

Primary Examiner—Curtis Kuntz
Assistant Examiner—Quoc D Tran

(57) ABSTRACT

A subscriber loop test apparatus relates to the testing of a subscriber loop by the use of a touchtone telephone. The touchstone buttons on a telephone provide Dual-Tone, Multiple Frequencies for each key pressed. For example, referring to FIG. 1, pressing the '3' key causes tones at 697 and 1477 Hz to be sent across the telephone line. Pressing a sequence of keys provides discrete coverage of the frequency band from 697 to 1477 Hz, through the use of the touchtone telephone. The frequency band from 697 to 1477 Hz can be characterized in this fashion. Information about the line: loop loss (loop length), presence of bridge taps (i.e., excessively long bridge taps in particular) or loading coils, and the presence of Digital Loop Carriers (DLCs), et cetera. The use of the switch-hook flash provides the ability to determine the channel (impulse) response of the loop, including any noise and hum that may be on the loop due to imbalance or coupled interference.

16 Claims, 4 Drawing Sheets

METHOD AND SYSTEM FOR TESTING SUBSCRIBER LOOPS USING TOUCHTONE TELEPHONE SIGNALS

This application claims the benefit of U.S. Provisional Application No. 60/297,070 filed on Jun. 8, 2001 and entitled "Method and System For Testing Broadband Capability Of A Subscriber Loop Using touchtone Telephone Signals."

FIELD OF THE INVENTION

This invention relates to determining suitability of an existing subscriber loop for supporting broadband services (i.e., DSL). It specifically concerns remote testing of such a subscriber loop and in particular performing tests without access to the subscriber loop and without requiring equipment and/or craft personal to be present at a customer end of the subscriber loop. In a specific embodiment, it involves using existing voiceband and touchtone keys of a standard telephone to determine suitability of an access line to provide broadband/DSL service.

BACKGROUND OF THE INVENTION

To provide broadband service over conventional subscriber loops (i.e., herein that circuitry connecting a network's central office to a subscriber premises; commonly a pair of wires) conventionally requires access to the subscriber premises to perform tests that assure that the loop is capable of providing broadband (i.e. DSL) service. The effects of loop network components such as loading coils, bridge taps, loop distance, and digital loop carriers (DLCs) severely adversely impact the ability to provide broadband service to an unacceptable extent.

Testing of subscriber loops (physical circuitry connecting a customer's premises to a central office) has become an important process for broadband service providers. All loop lines are not capable of providing broadband DSL service. These lines were never originally designed for this purpose. Unfortunately, the lines that are incapable of supplying broadband service are not known ahead of time; so, the lines must be tested for their ability to send/receive broadband signals. Several methods exist to perform this function. If you are the service provider who owns the loop (Incumbent Local Exchange Carrier or ILEC who runs the CO, typically), then you can test the wire directly, over any frequency band, from the CO to the customer premises. However, if you are a Competitive Local Exchange Carrier (CLEC), then the digitization of received signals that occurs at the CO limits an ability to test the loop to the voice band of the line, typically 300 to 3300 Hz. This limitation is due to a digital signal sampling property (Nyquist Criterion) of 4000 Hz maximum since the signal is typically sampled at 8000 Hz with 8 bit precision.

It would be advantageous to be able to test the subscriber loop using data obtained only from the voice band and extrapolate the results to the broader DSL frequency band (typically to 1 MHz). Such a system has been disclosed in U.S. Pat. No. 6,091,713, but the technique described therein requires a subscriber to be connected to test equipment through a voice band modem located at the customer premises. Their process uses data stored in registers that provide data obtained during the handshake or negotiation process; this voice band information is extrapolated for use over the greater DSL band. There may be times, however, where it is necessary or desirable to test the line without the use of a modem or computer (logic device) at the customer premises. One particular situation is where the test provider does not have direct access to the subscriber loop. In this instance, sending a craft person to the premise or providing special equipment at a customer site is prohibitively expensive.

It is desirable to test a subscriber loop for broadband service suitability without access to the customer premises and without the use of modems, personal computers and special logic devices on the customer premises.

A SUMMARY OF THE INVENTION

A subscriber loop test apparatus relates to the testing of a subscriber loop by the use of a touchtone telephone. The touchtones on a telephone provide Dual-Tone, Multiple Frequencies for each key pressed. For example, referring to FIG. 1, pressing the '3' key causes tones at 697 and 1477 Hz to be sent across the telephone line. Pressing a sequence of keys provides discrete coverage of the frequency band from 697 to 1477 Hz, through the use of the touchtone telephone. The frequency band from 697 to 1477 Hz can be characterized in this fashion. Information about the line: loop loss (loop length), presence of bridge taps (i.e., excessively long bridge taps in particular) or loading coils, and the presence of Digital Loop Carriers (DLCs), et cetera. The use of the switch-hook flash provides the ability to determine the channel (impulse) response of the loop, including any noise and hum that may be on the loop due to imbalance or coupled interference. Both of these techniques shall be termed 'user telephony input (UTI).'

In one specific embodiment, the testing technique uses existing voiceband and touchtone keys on a standard telephone to determine the suitability of a subscriber loop to provide broadband (DSL) service. The technique is advantageously integrated with an interactive voice response (IVR) system that provides inquiring subscribers instructions as to how to proceed and interact with a test server to determine broadband service suitability. With this arrangement a potential DSL user can be tested, prequalified and provisioned using a single automated process. This allows prompt and inexpensive service to the customer.

DETAILED DESCRIPTION

Figure 1:
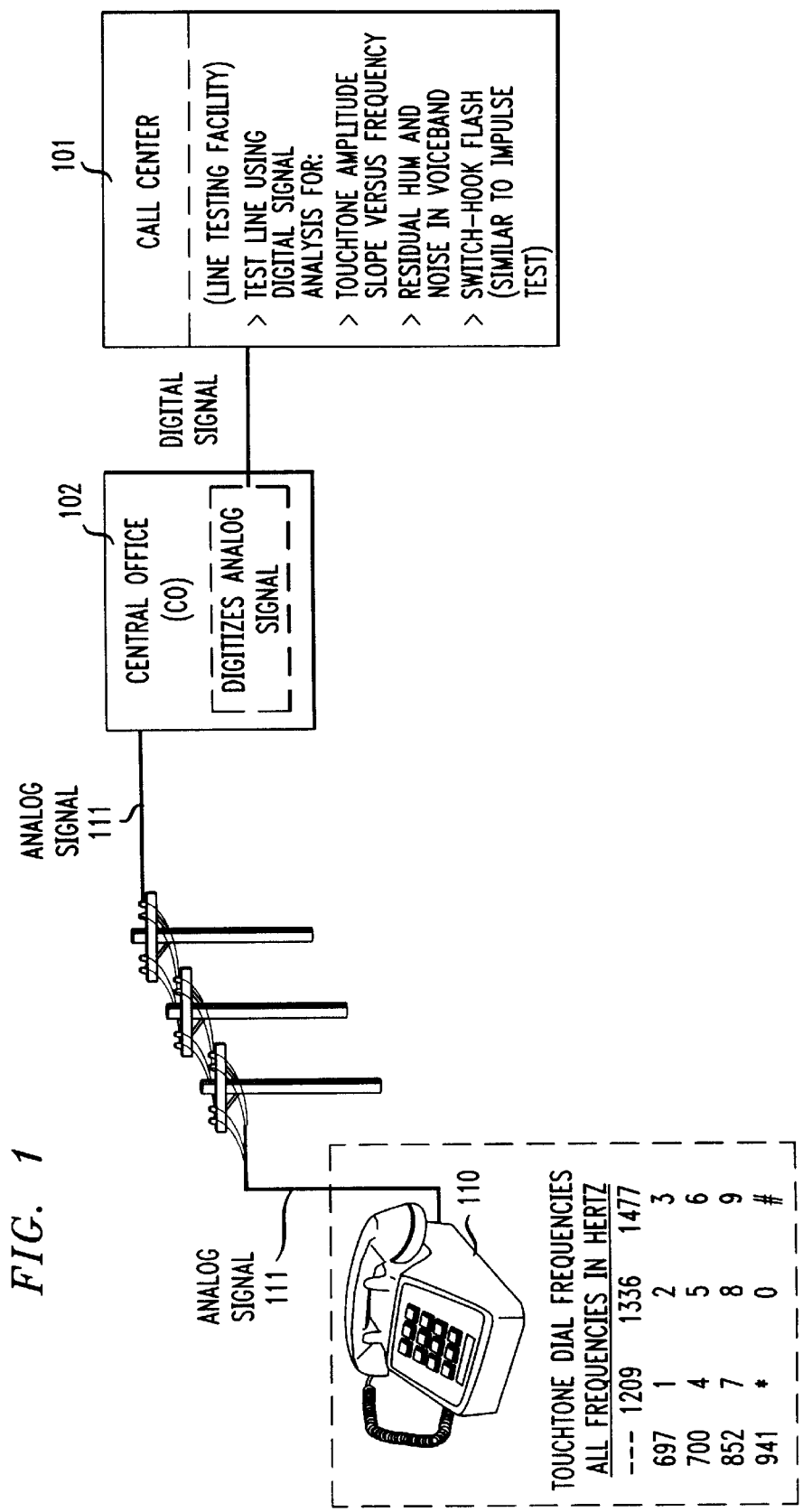
FIG. 1 is a schematic of a network including a subscriber loop, a central office, a subscriber device, a test facility and connecting lines.

Referring to FIG. 1, the invention requires a user, using a normal touchtone telephone 110, to dial a call center 101. The call is routed via local subscriber loop lines 111, as an analog signal to a central office 102 that digitizes the analog signal. This resulting digital signal makes it impossible to remotely test the subscriber loop over the full DSL frequency range. Through the call connection to the call center 101, the user is prompted to press a sequence of digits and to execute switch hook flashes from the touchtone telephone. This sequence of digits is the stimulus for the digital signal analyzer to test the line over the frequency band from 697 to 1477 Hz. Additional voice band characterization may be performed by instructing the user to quickly depress and release the switch hook of the telephone: this action provides a near-impulse response to the digital signal analyzer and allows the full voice band to be characterized. At the call center, these touchtone signals are digitally processed to analyze such variables as:
a) Touchtone amplitude slope versus frequency;
b) Residual hum and noise within the voice band; and
c) Impulse response through the switch hook flash.
None of these actions require modems, computers or logic devices to be present or used at the customer's premises.

The testing of suitability for DSL service through this automated process may in one illustrative aspect consist of up to four different parts. The results of these individual parts can be analyzed either independently, or taken as a whole. When looked at as a whole, an even better determination of DSL suitability can be made. The four aspects to the prequalification process include the items discussed below.

An address lookup based on the calling user's phone number (delivered through Automatic Number Identification,) is made in coordination with the incumbent local exchange carrier (ILEC), and can provide an estimate of the geographical distance from the serving central office (CO) and the user's home site. Since service suitability for DSL is strongly linked to distance between the customer premise and the CO, this measurement is a primary critical element used in the decision process.

A second aspect in determining loop suitability is made by querying a database of existing users who reside in the same neighborhood as the user seeking prequalification. This existing user database would be able to provide a broadband loop measurement result on existing users, as well as the current and maximum data rates possible on these users lines. Users close to the person being prequalified will most likely share the same wire bundle back to the central office, and similar statistics with regards to the use of load coils and bridge taps. Therefore, the availability of this information would be very helpful in predicting DSL suitability.

A third aspect in determining DSL suitability involves a direct electrical measurement of the user's line. An IVR system would prompt the user to press several keys on his telephone keypad. By doing so, the user generates dual tone multi-frequency (DTMF) signals back to the IVR system for measurement. These DTMF signals consist of a low tone (indicating keypad row), and a high tone (indicating keypad column). The DTMF frequency pairs are as follows (the last column is not used in standard telephones):

|        | 1209 Hz | 1336 Hz | 1477 Hz | 1633 Hz |
|--------|---------|---------|---------|---------|
| 697 Hz | 1       | 2       | 3       | A       |
| 770 Hz | 4       | 5       | 6       | B       |
| 852 Hz | 7       | 8       | 9       | C       |
| 941 Hz | *       | 0       | #       | D       |

The amplitude of the tones when transmitted from the user's telephone is relatively well dictated by existing specifications, though minor variability will exist. By comparing the amplitude of each of the received tones with the expected amplitude of the tones, the following information about the user's line can be determined:

Since the transmission line characteristics of analog telephone loops are well understood, a mathematical loop model can be created based on loop length and wire gauge. By measuring the individual received tone amplitudes and fitting this data to the model, an electrical (as opposed to geographical) estimate of loop length can be made.

This electrical estimate of loop length can be compared to the geographical estimate made earlier. If the electrical estimate indicates a significantly shorter loop than indicated by geography, then there is a high likelihood that the user's loop is attached to a digital loop carrier (DLC). Since a DLC terminates the user's loop remote from the CO, such loops are considered unsuitable for DSL service.

If the electrical measurements indicate there is attenuation in the loop consistent with its geographical length, but the frequency response is flatter than predicted, then there is a high likelihood that this loop has a load coil attached to it. Load coils are devices commonly used on very long loops to improve voice quality by boosting high frequency response (which is heavily attenuated on long loops). While these devices improve voice response, they attenuate all frequencies above the voice band. Since this is precisely where the DSL signal lies, load coils are a strong indication that this line is not suitable for DSL service.

A third form of loop impairment that can affect DSL service is bridge taps. A bridge tap is an unterminated wire pair that is attached to the user's loop somewhere along its length. The effect of bridge taps is to cause a series of dropouts in the frequency response of the loop, which affects the available data rate to/from the user's home. Since bridge taps are more likely to impact frequency above the voice band rather than in the voice band, they are not as easy to detect with a simple voice band measurement. However, it is possible that one of these dropouts could fall in the range of the DTMF tones and be detected. If so, this detected bridge tap could also be used in conjunction with the distance estimates to determine DSL suitability. A bridge tap is not a direct indication that the line is unsuitable, but when combined with length, it may be determined that the user's loop cannot support the expected data rate offered.

In addition to the measurement of DTMF tones from the user's phone, an active measurement of the loop could be performed. This measurement would involve the following phases: (1) The IVR system informs the user that a brief test is to be performed and that a series of tones and noise will be heard. (2) The IVR system then activates a 2100 Hz tone with 180° phase reversals to deactivate the network echo cancellation. By deactivating the echo cancellation, the IVR system will be able to measure both the near-end (CO) and far-end (CPE) echo on the user's loop. (3) Once the echo cancellers are deactivated, the IVR system transmits a pseudo-random noise sequence to the user's phone and collects measurements. (4) The received measurements are correlated with the transmitted noise to determine the impulse response of the loop. (5) The frequency response (determined by taking a Fourier transform of the impulse response) can be used to detect load coil presence, and whether a bridge tap that affects the voice band is present. As above, this data can be combined with the DTMF measurement to improve the decision process.

Figure 2:
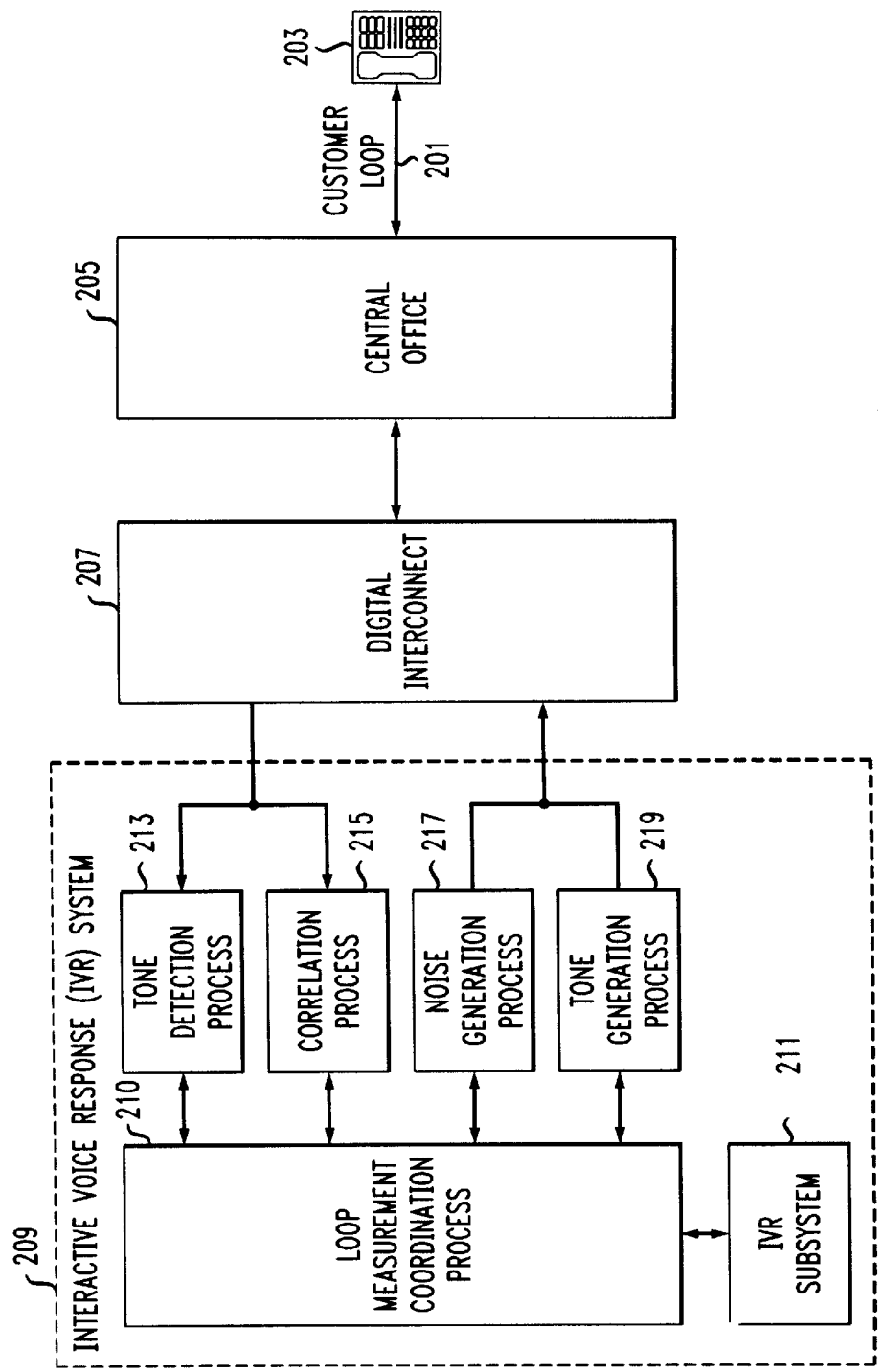
FIG. 2 is a block schematic of an illustrative architecture for providing DSL loop prequalification.

An illustrative DSL prequalification architecture executing these steps embodies an interactive voice response system as shown in the FIG. 2 to inform customers that an active test of the loop is to be performed. This system interacts with a customer loop 201 joining a subscriber device 203 to a central office 205 to permit interactive evaluation of the loop 201. An interactive voice response (IVR) system 209 is connected to the central office via a digital interconnect 207. System 209 includes an interactive response voice subsystem 211 to respond to voice commands and to generate voice messages and responses. Such interactive voice subsystems are known in the art and further discussion is not believed necessary.

The IVR system includes a coordination processor 210 which through sub processors 213, 215 217 and 219 interact with the digital interconnect 207. Sub processor 213 is a tone detection processor, which deciphers the received multi-tones generated by a subscriber in assisting loop evaluation. Correlation processor 215 correlates the received dual tones with noise generated and transmitted by a noise generation processor 217, the noise being transmitted to determine an impulse response of the loop. A tone generator 219 is provided to generate a series of tones for transmission to the loop under test.

Figure 3:
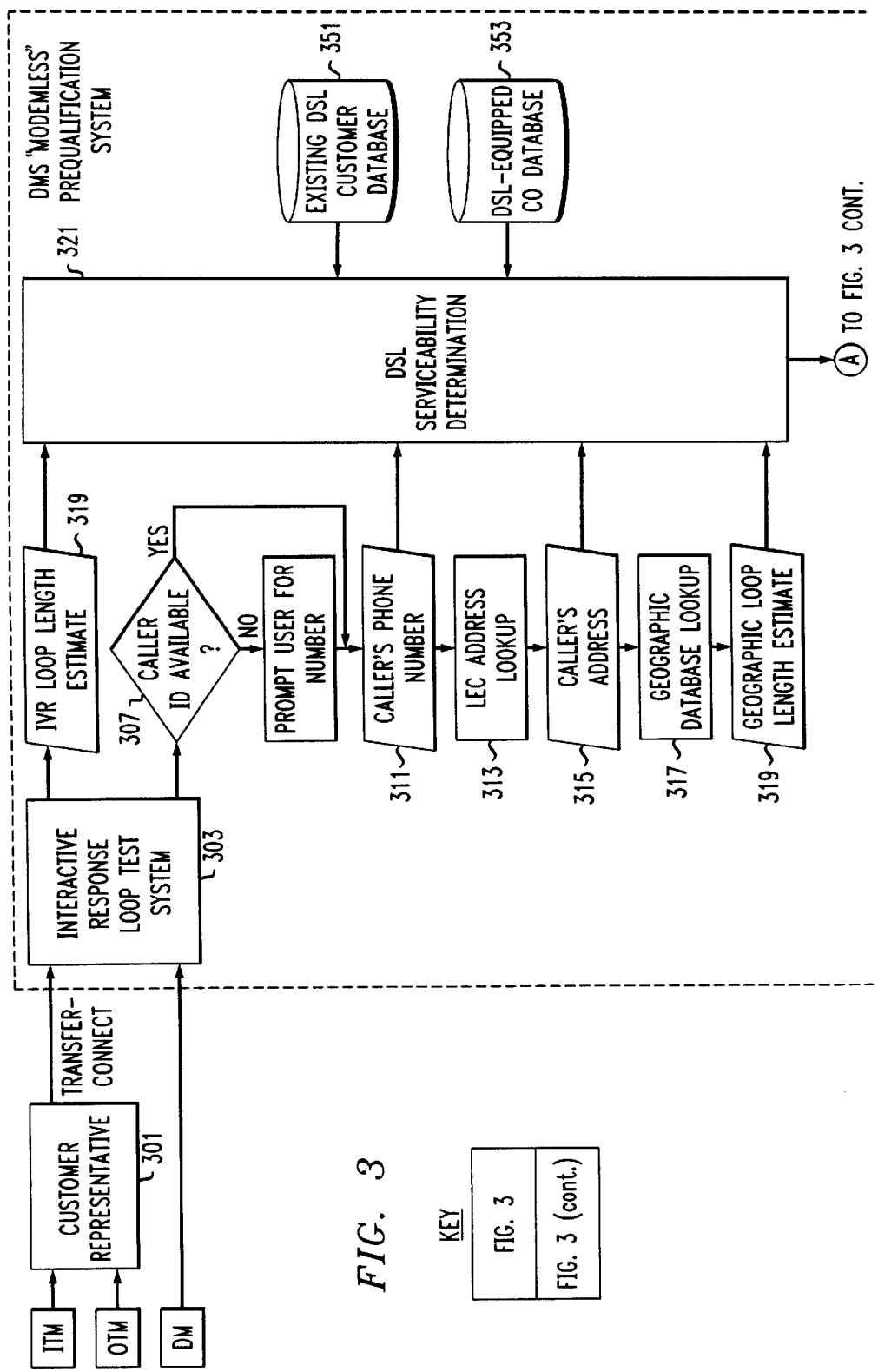
FIG. 3 is a schematic of an illustrative process architecture used in prequalifying a line for suitability in providing broadband service to a customer.
Figure 3:
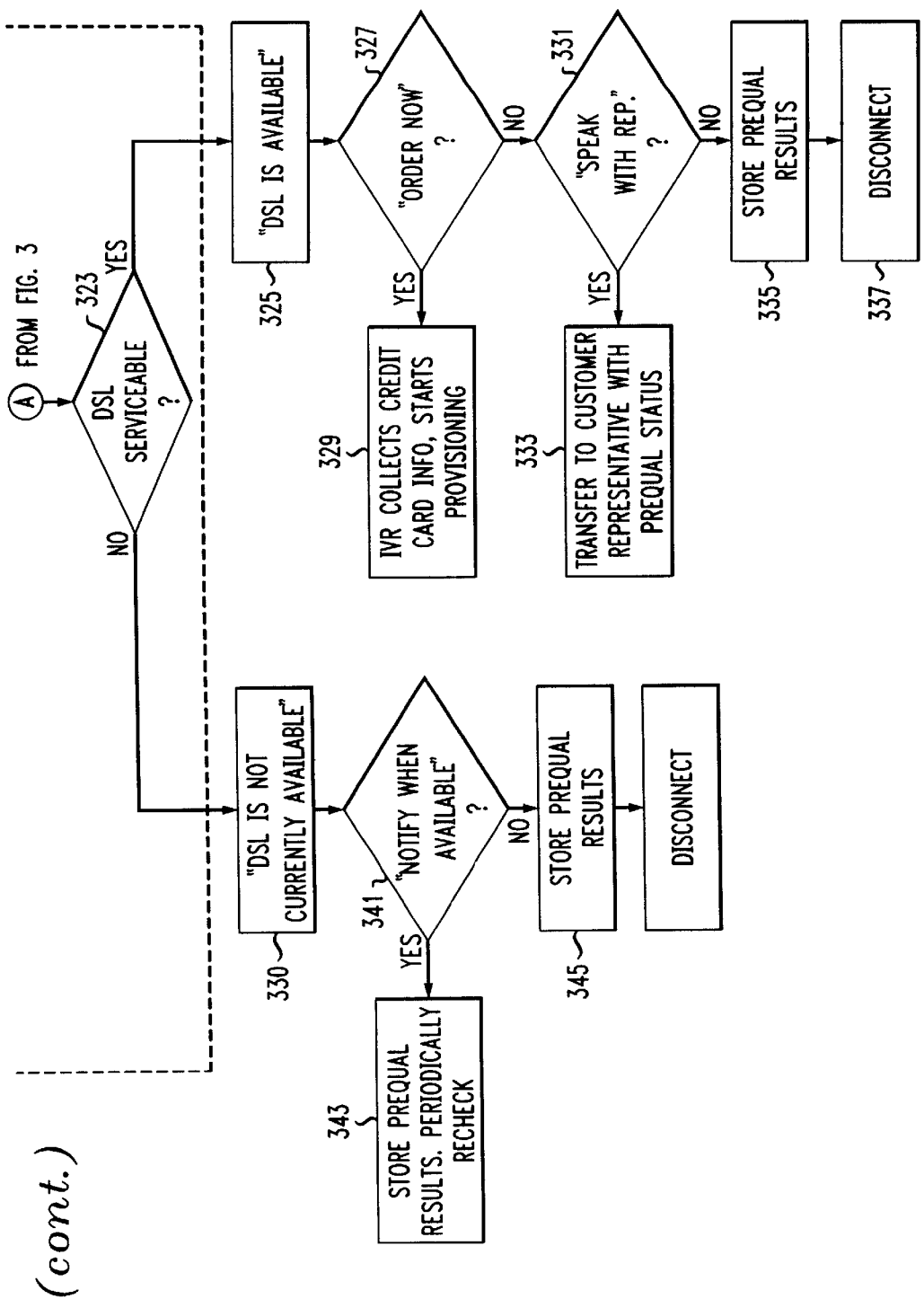

A prequalification process is illustrated by the architecture diagram of FIG. 3 in which an evaluation is initiated by a customer representative 301 in response to either an inbound telemarketing system or an outbound telemarketing system (i.e., on line customer initiated or network initiated). A direct marketing initiation is also permitted to initiate the process. The process is initiated by step 303, which evaluates tone signals provided by a testing sequence such as indicated by the steps described above. The process proceeds, in step 305, to investigate records to determine an IVR loop length estimate based on amplitude of tones received from a customer. This is derived from the existing DSL customer database whereby the known length of nearby DSL customers is determined. Step 307 investigates if a caller ID is available. If available, the process proceeds to step 311 where the caller's number recorded for an address lookup in step 313 and the caller's address is recorded in step 315. A geographic database uses the address information for evaluation in step 317 to provide a geographic loop length estimate in step 319.

The data determined by steps 305 through 319 and test system 303 are transmitted to a DSL Serviceability determination 321 which in conjunction with stored data in the DSL customer data base 351 and the DSL equipped Central Office (CO) database 353 (i.e., identifies which CO can provide DSL service) assembles all the information to make a decision in the decision step 323. If DSL is not available in a nearby CO as in step 339, a decision is made in step 341 as whether to notify the customer that DSL is not available. In step 343, the availability is periodically revisited. In step 345, the test results are stored and the system test is disconnected.

If the loop supports DSL service in the determination of step 323 the availability is noted in step 325 and a determination is made by the customer (in decision step 327) as to whether to order DSL service now. Service is ordered immediately through the IVR system in step 329. If a service representative is contacted as per step 331, the order may be processed by a customer representative with prequalification status in step 333. In an alternate qualification, results are stored for further use in step 335 and the customer is disconnected in step 337.

It is also readily apparent that this testing method and system does not require ownership or access to the subscriber loop, nor is special equipment (i.e., modem, PC, logic devices etc.) required to be located at a customer premise This permits CLECs to readily determine their ability to provide broadband services over a normally voice band subscriber loop.

It is readily apparent that this system is closely integrated with customer service and art various points in the process a potential customer has an ability to interact with a customer service representative. These points occur at the beginning of the process and at several steps within the process. Accordingly, the potential customer may start with a customer representative switch into the automated process and return to a customer representative and subsequently proceed with the automated process.

In one illustrative process, a customer may call into AT&T asking about DSL service with a representative. The representative can transfer them to the DSL prequalification system, and then get the customer transferred back along with the results. At that time, if service is available, the customer could immediately enter the provisioning process.

In contrast, most DSL competitors must do their DSL prequalification separate from their provisioning—the customer must either do a prequalification using their modem (requiring a completely different phone call), must enter address information into a website, or must speak with a company representative who manually processes the prequalification. All of these methods are more expensive and less efficient.

Another option for measuring the user's line would be to have the IVR (FIG. 2) ask the potential customer whether they have a facsimile (FAX) machine. If so, the user could be requested to fax a document (any document, content is unimportant) to the IVR system. The information about the channel transmitted during the fax modem handshake could be used to determine the frequency response and attenuation of the channel. As before, this information could be used to supplement information gained from the geographical measurement, the DTMF measurement, and the impulse response measurement to further improve the estimate of the user's loop length and serviceability.

We claim:

1. A method of testing an analog subscriber loop for capacity to carry broadband signals, comprising steps of:

securing completing of a call from a touchtone telephone set located at a customer premise to a line testing facility located within a call center;

instructing a subscriber to provide user telephone input by signaling the caller center with a sequence of actions including one of the touch-tones and switch hook flashes;

activating a 2100 Hz tone with 180 degree phase reversal to deactivate echo canceling, and transmitting a pseudo random noise seciuence to a customers phone;

using the signals received at the call center to characterize the subscribe loop and provide information about a capability of the subscriber loop to provide broad band service.

2. The method of claim 1, wherein:

the step of providing information includes;
determining a frequency response of the signal;
determining a loop loss and loop length; and
determining an impulse response of the loop;
and determining loop hum and noise.

3. The method of claim 2, wherein:

the step of determining a loop length includes;
looking up an address of a customer and securing a geographical distance from at least one of phone company to the customer.

4. The method of claim 2, wherein the step of determining a loop length and loop characteristics includes;
querying a database for information of DSL users nearby to the prospective customer for DSL service.

5. The method of claim 2, wherein:

testing includes instructing a subscriber to perform tone signaling steps directed to a call center through means of an interactive voice response system.

6. The method of claim 1, wherein:

testing and a pseudo random noise sequence includes taking a Fourier transform of the measured impulse response.

7. A method of prequalifying a customer for broadband DSL service over a subscriber loop, comprising steps of:

establishing telephone contact with a customer over a subscriber loop;

determining a length of the subscriber loop;

connecting to a central office via the subscriber loop;

instructing the customer to perform specified functions including:

sending combinations of touch tones to a central office in response to commands, including having a customer dialing a series of given numbers to generate DTMF tones and having the customer provide switch hook flashes;

evaluating the signals received at the central office to determine suitability of the subscriber loop for supporting broadband DSL service.

8. The method of claim 7 wherein:

the step of determining a length includes searching a data base by address look up for subscriber loop lengths.

9. The method of claim 7 wherein:

the step of determining a length includes measuring a signal amplitude.

10. The method of claim 7 wherein:

the step of sending includes sending a switch hook flash to a central office.

11. The method of claim 7 wherein:

the step of evaluating includes converting signals sent to the central office into digital form and analyzing the digital signals.

12. The method of claim 7 further including:

determining if a customer's serving central office can provide broadband DSL service; and determining that the customer's serving central office does not have broadband DSL capability at this time; and providing the option to notify the customer in the event that broadband DSL service becomes available at this central office at a future date.

13. The method of claim 7 further including;

communicating with a customer through an interactive voice response system.

14. The method of claim 7 further including:

instructing a customer to send a fax a document for part of the step of evaluation.

15. The method of claim 7 further including:

enabling a customer to interact with a customer representative during various stages of the prequalifying method without terminating the prequalifying process.

16. The method of claim 15 further including:

enabling immediate provisioning if a determination is made that service is available.

* * * * *